United States Patent Office 3,363,879
Patented Jan. 16, 1968

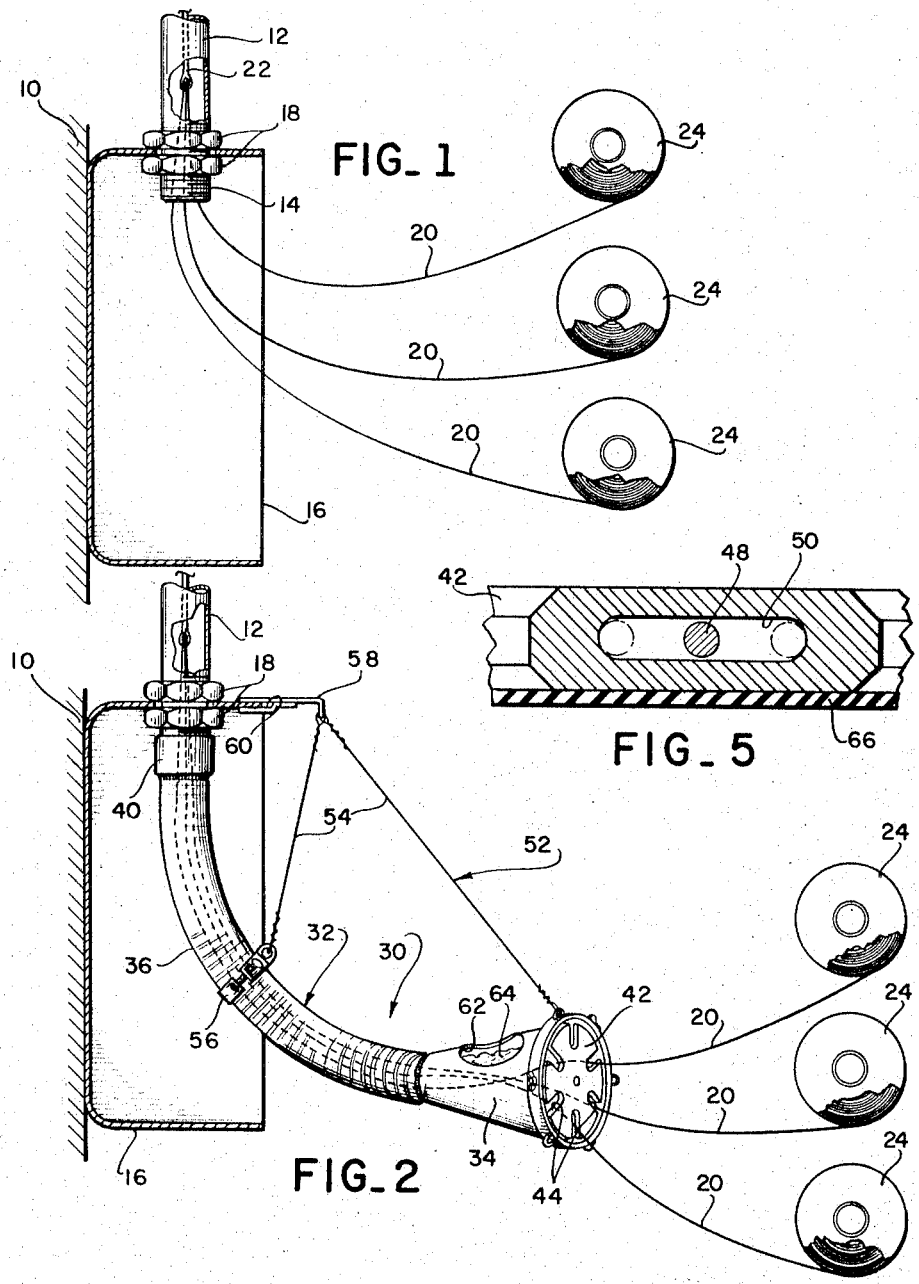

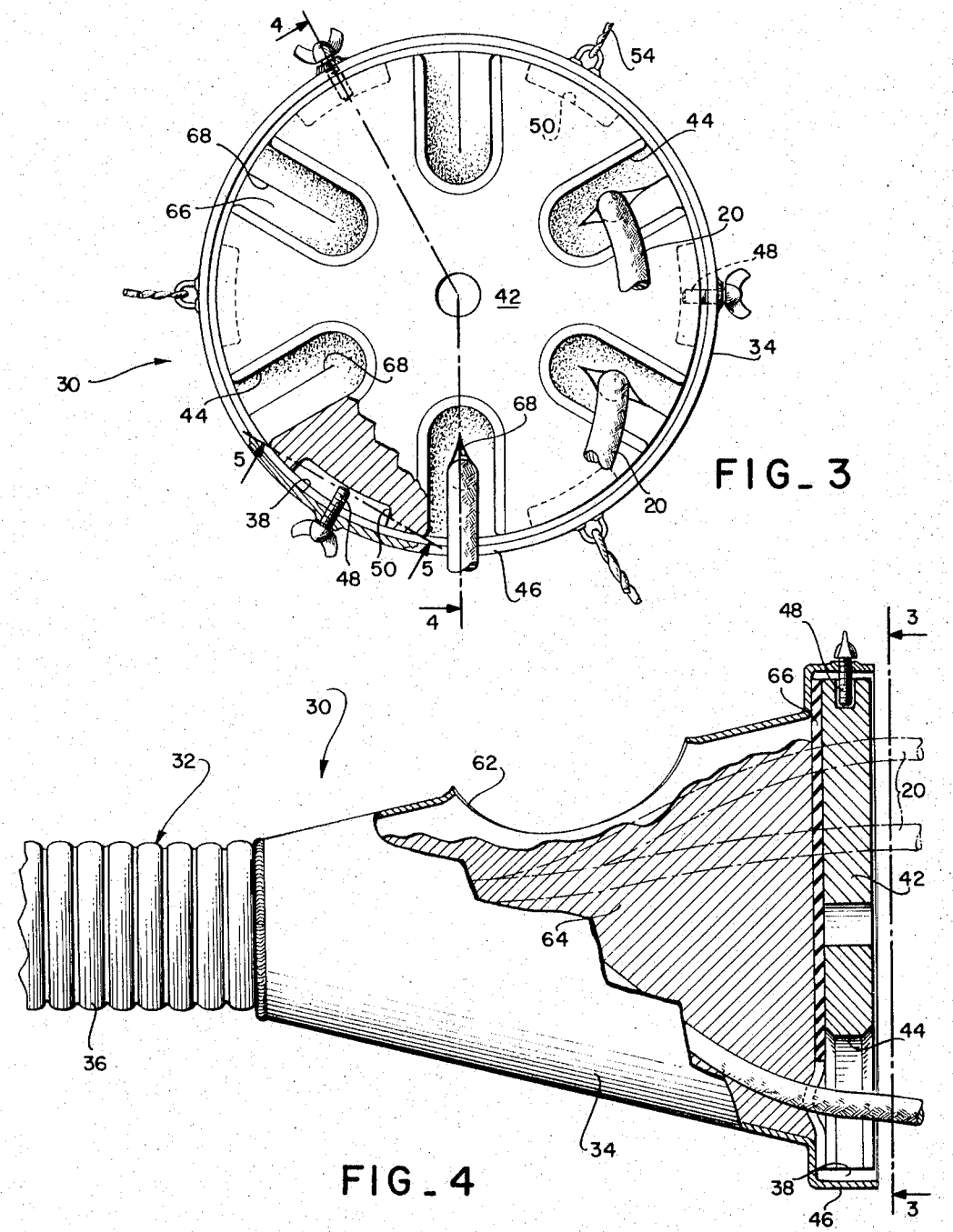

3,363,879
CABLE GUIDE FOR GUIDING CABLE
INTO CONDUITS
Harry Irik, Santa Monica, Calif., assignor to Grantham &
Oleson Electrical Contractors, Inc., Venice, Calif., a
corporation of California
Filed Oct. 24, 1965, Ser. No. 504,737
7 Claims. (Cl. 254—134.3)

ABSTRACT OF THE DISCLOSURE

A guide for guiding a cable into a conduit comprising a flexible tube having an enlarged diameter at the cable entrance end and a smaller diameter at the other end for connection to the conduit and an entrance cable member within the entrance end having limited floating movement and having a number of separate cable receiving spaces.

This invention relates generally to cable guides and has more particular reference to an entrance guide for guiding cables into conduits and the like.

As will appear from the ensuing description, the present cable guide may be employed for guiding various types of cables and cable-like members into conduits and other relatively small passages. Accordingly, the term "cable" is used in this disclosure in its generic sense to encompass all types of flexible cables and cable-like members, such as wire cables, insulated electrical conductors, or wires, and so on. However, the cable guide is intended primarily for use in the electrical contracting trade to guide electrical wires into electrical conduits which have been previously installed in a building structure. For this reason, the invention will be described herein in connection with, but without intended limitation to, this particular application thereof.

According to conventional building practice, electrical conduits are installed in a building structure during the initial stages of its construction. Thereafter, electrical conductors, or wires, are threaded through the conduits. This is accomplished by first passing a pull line through a conduit from one end to the other and attaching the leading end of the conduit to the wire or wires to be threaded through the conduit. The pull line is then pulled back through the conduit whereby the wires attached to the line are pulled into and through the conduit. The wires are commonly wound on reels or drums from which the wires unwind as they enter the conduit. In order to prevent jamming of the wires in the conduit, the wires must be guided into the conduit in such a way as to prevent them from twisting about one another or otherwise becoming snarled or entangled. It is also common practice to apply grease or other suitable lubricants to the wires as they enter the conduit in order to reduce the frictional drag imposed on the wires by the wall of the conduit.

Various types of cable entrance guides have been devised for use in connection with threading electrical wires into electrical conduits. These guides comprise, generally, a body having a relatively large entrance end through which the cables or wires enter the guide and a relatively small exit end which is attached to one end of a conduit and through which the wires emerge from the guide into the conduit. Extending across the entrance end of the guide is an entrance guide member having a number of guide openings through which the wires or cables pass to the interior of the guide.

The existing cable entrance guides of this type tend to be deficient for one reason or another. It is a principal aim of this invention to cure these deficiencies. One of the deficiencies of the prior art cable entrance guides, for example, resides in the fact that they are devoid of any means for coating the entering cables or wires with grease. As a result, the entering wires must be greased by hand as they approach the cable entrance guide, or, in the absence of such a guide, as the wires approach the conduit. Another deficiency of the prior art cable entrance guides is that the entrance guide member of these guides is fixed against floating movement with the entering cables. This rigid or non-floating mounting of the entrance guide member results in the imposition of excessive frictional drag on the entering cables. Moreover, there is a tendency for the cables to snag on the entrance guide member. A serious deficiency of some prior art cable entrance guides is that the entrance guide member is not removable from the guide housing. As a consequence, it is necessary to thread the cables through the guide member prior to attachment of the cables to the pull line by which the cables are drawn through the conduit. This renders difficult the task of attaching the pull line to the cables.

It is a general object of this invention to provide an improved cable entrance guide for the purposes described which avoids the above-noted and other deficiencies of the existing guides of this type.

A more specific object of the invention is to provide a cable entrance guide wherein the entrance guide member through which the cables pass to the interior of the guide is mounted for limited movement relative to the body of the guide, thereby to permit the entrance guide member to float with the entering cables in such a way as to minimize the drag imposed on the cables and the possibility of snarling of the cables and snagging of the latter on the entrance guide member.

A related object of the invention is to provide a cable entrance guide of the character described in which the entrance guide member is removable from the guide body and is constructed in such a way as to permit the guide member to be installed in the body after the wires have been threaded therethrough and attached to the cable pull line.

Another object of the invention is to provide a cable entrance guide of the character described which may be packed with grease for the purpose of coating with grease each cable travelling through the guide.

A related object of the invention is to provide a cable entrance guide of the character described wherein the entrance guide member is uniquely constructed to prevent leakage of grease through the cable-receiving openings therein without interfering with initial threading of the cables into the guide or subsequent free movement of the cables through the guide.

A further object of the invention is to provide a cable entrance guide of the character described which is flexible to permit cables to be guided into conduits having relatively inaccessible open ends.

Yet a further object of the invention is to provide a cable entrance guide of the character described which is relatively simple in construction, economical to manufacture, easy to install and remove, and is otherwise ideally suited to its intended purposes.

Other objects, advantages, and features of the invention will become readily evident as the description proceeds.

With these and such other objects in view, the invention consists in the construction, arrangement, and combination of the various parts of the invention whereby the objects contemplated are attained, as hereinafter set forth, pointed out in the appended claims, and illustrated in the accompanying drawings.

In these drawings:

FIGURE 1 is a section through an electrical conduit and junction box and illustrates one existing method of threading electrical cables or wires, through the conduit;

FIGURE 2 illustrates the present improved cable entrance guide installed on the conduit in FIGURE 1;

FIGURE 3 is a section taken on line 3—3 in FIGURE 4;

FIGURE 4 is a section taken on line 4—4 in FIGURE 3; and

FIGURE 5 is an enlarged section taken on line 5—5 in FIGURE 3.

In FIGURE 1 of these drawings, there is shown a building structure 10 in which has been installed an electrical conduit 12. One end of conduit 12 mounts an externally threaded connector 14 which extends through an opening in one wall of a junction box 16 and is secured to the box by nuts 18 threaded on the connector at opposite sides of the wall. According to one existing practice of threading a number of electrical cables or wires 20 through the conduit 12, a pull line 22 is first threaded through the conduit from the remote end thereof to a position in which the leading end of the pull line extends into the junction box 16. The leading end of the line is then attached to the adjacent ends of the wires 20, which are commonly wound on reels or drums 24. Finally, the pull line 22 is pulled back through the conduit to pull the wires into and through the conduit to the remote end of the latter.

The wires must be guided into the open end of the conduit 12 in order to prevent snarling and twisting of the wires about one another and scraping of the wires by the edge of the conduit surrounding its open end. In the absence of a cable guide, as in FIGURE 1, the cables are guided into the cenduit by hand, thereby increasing the wiring time and cost. Moreover, the wires are difficult to properly manually guide into the conduit. In other cases, a cable entrance guide of some kind may be employed. As noted earlier, however, the existing guides for this purpose are subject to various deficiencies. The wires 20 are commonly coated with grease to permit them to slide more freely through the conduit 12. At the current state of the art, this greasing of the wires is commonly performed manually by one or more workers stationed between the junction box 16 and the wire drums 24. Accordingly, the task of greasing the wires tends to be costly, difficult, and messy.

FIGURES 2 through 5 illustrate an improved cable entrance guide 30 according to the invention which alleviates the above and other problems associated with wiring a building structure. Cable guide 30 comprises a flexible, generally funnel-shaped body 32 including a rigid entrance cone 34 and a flexible exit tube 36. In the entrance end of the entrance cone is a relatively large entrance opening 38. In the exit end of the exit tube 36 is a relatively small exit opening (not shown). The exit end of the exit tube mounts an internally threaded coupling sleeve 40 which is adapted to be threaded on the conduit connector 14. Because the exit tube 36 is flexible, the entrance and exit ends of the cable guide 30 may be adjusted to different relative angular positions, as is desirable or necessary when the end of the conduit to which the guide is to be attached is located within a confined space, such as in the junction box 16. Exit tube 36 may be constructed in various ways. Preferably, this tube comprises a flexible walled conduit composed of rigid articulated conduit sections, as shown.

Disposed within the cable guide entrance opening 38 is an entrance guide member or plate 42. This entrance guide plate has a number of cable-receiving openings or slots 44 spaced about the central axis of the guide housing 32 and opening through the edge of the plate. Surrounding the entrance guide plate 42 is a coaxial cylindrical flange or rim 46 on the entrance cone 34. The entrance guide plate 42 is removably secured to the entrance cone in order to permit the guide plate to be detached when initially securing the wires 20 to the pull line 22. This removable attachment may be accomplished in various ways. According to preferred practice of the invention, the entrance guide plate 42 is secured to the entrance cone 34 by screws 48 which are threaded in the cone rim 46 and engage in circumferentially elongated grooves 50 in the edge of the guide plate, between adjacent guide plate slots 44. The entrance guide plate 42 is thereby capable of limited rotational movement relative to the cable guide body 32, about the body axis. As will appear presently, this permits the entrance guide plate 42 to float with the entering cables or wires 20 in such a way as to reduce the frictional drag imposed on the wires by the cable guide 30.

In most applications of the cable guide 30, including that illustrated in the drawings, it is necessary to support the entrance end of the guide in some way. To this end, the illustrated cable guide 30 is equipped with supporting means 52 including supporting members or cables 54 which are attached at one end to the outer end of the entrance cone 34 and to a clamp 56 attached to the exit tube 36 of the guide. The opposite ends of the supporting cables 54 are attached to a bracket 58 having a slot 60 to receive one wall of the junction box 16. After the cable guide 30 has been attached to the conduit 12, in the manner shown in FIGURE 2, the supporting bracket 58 is placed in straddling relation to the upper wall of the junction box 16 to support the entrance end of the cable guide 30 in the proper attitude for guiding the cables or wires 20 from the wire drums 24 to the conduit 12.

In use of the cable entrance guide 30 to guide the electrical cables or wires 20 into the conduit 12, the coupling sleeve 40 of the guide is threaded on the conduit connector 14. The supporting bracket 58 for the guide is then attached to the junction box 16 to support the entrance end of the cable guide in the desired attitude. Thereafter, the entrance guide member or plate 42 is removed from the entrance cone 34 and the ends of the wires 20 are attached to the pull line 22. In this regard, it is assumed that the pull line has been inserted through the conduit 12 to a position wherein the leading end of the pull line extends through the entrance end of the cable guide cone 34. At this point, therefore, it is significant to note that an important advantage of the illustrated cable entrance guide 30 resides in the fact that the entrance guide plate 42 may be removed from the guide body 32 in order to permit attachment of the cables or wires 20 to the pull line 22 externally of the body. This attachment may thus be quickly and easily accomplished, much more so, for example, than if the attachment had to be made within the body. The pull line 22 is then pulled back through the conduit 12 to a position wherein the leading ends of the wires 20 are located within the entrance cone 34 and the entrance guide plate 42 is re-installed in the entrance end of the cone. Thereafter, the wires are pulled through the conduit 21 by the pull line 22. As the wires enter the guide 30, they are retained in spaced relation by the entrance guide plate 42 which, thereby, restrains the wires against twisting about one another or otherwise snarling. As noted earlier, the entrance guide plate 42 is mounted for limited rotational floating movement relative to the guide body 32. This floating movement of the entrance guide plate minimizes the frictional drag imposed on the wires 20 by the cable entrance guide 30 and, in addition, minimizes or eliminates the tendency for the wires to snag or catch on the entrance guide plate.

In order to reduce the frictional resistance between the wires 20 and the wall of the conduit 12, and thereby permit the wires 20 to be pulled easily through the conduit, it is desirable to coat the wires with grease before they enter the conduit. To this end, the entrance cone 34 of the present cable entrance guide 30 is provided with an opening 62 through which the interior of the housing may be packed with grease 64. This grease adheres to the wires 20 as the latter travel through the housing to a conduit 12. When the present cable entrance guide 30 is provided with such a grease packing opening, it is desirable to construct the entrance guide plate 42 in such a way as to minimize or prevent leakage of grease through the openings or slots 44 in the plate. This may be accomplished in various ways. As shown in the drawings, for example, a thin sealing sheet 66 of flexible resilient material, such as rubber, may be bonded or otherwise secured to the inner face of the guide plate 42. In line with the cable-receiving openings or slots 44 in this plate, the sheet 66 is slit, as shown at 68. The slits 68 preferably extend through the outer edge of the sealing sheet 66 in order to permit the entrance guide plate 42 to be installed in the entrance end of the cable guide 30 after the wires 20 have been pulled into the guide, as described earlier.

It is evident that the wires 20 may pass freely through the slits 68 in the sealing sheet 66 and that these slits tend to conform to the wires in such a way as to minimize or prevent the leakage of grease from the interior of the cable guide through the guide plate slots 44. The slits 68 are normally closed, as shown in FIGURE 3, so that the sealing sheet 66 also blocks grease leakage through the entrance guide plate slots 44 which contain no wires 20.

It is now evident, therefore, that the invention herein described and illustrated is fully capable of attaining the several objects and advantages preliminary set forth.

While a presently preferred embodiment of the invention has been disclosed for illustrative purposes, various modifications in the design, arrangement of parts, and instrumentalities of the invention are possible within the spirit and scope of the following claims.

What is claimed as new in support of Letters Patent is:

1. An entrance guide for guiding cables and the like into a conduit comprising:
   a hollow body having an open, relatively large diameter entrance end through which the cables are adapted to enter the body and an opposite open, relatively small diameter exit end for connection to the conduit;
   an entrance guide member disposed within said entrance end of said body and having a number of cable-receiving openings spaced about the axis of said body; and
   means connecting said guide member to said body for limited floating movement of said member relative to said body about said axis.

2. A guide according to claim 1 wherein:
   said guide member comprises a circular plate;
   said cable-receiving openings comprise generally radial slots in and opening through the edge of said plate; and
   said connecting means comprise screws threaded in the wall of said body and extending radially inward into circumferentially elongated grooves in the edge of said plate between said slots.

3. An entrance guide for guiding cables and the like into a conduit comprising:
   a hollow body having an open, relatively large diameter entrance end through which the cables are adapted to enter the body and an opposite open, relatively small diameter exit end for connection to the conduit;
   an entrance guide member mounted in the entrance end of said body and having at least one cable-receiving opening extending therethrough;
   means on said body whereby the interior of said body may be packed with grease; and
   means on said guide member for sealing said cable-receiving opening against leakage of grease therethrough when said opening contains a cable as well as when said opening does not contain a cable.

4. A guide according to claim 3 wherein:
   said sealing means comprises a flexible resilient sheet secured to said guide member and having a normally closed slit aligned with said cable-receiving opening.

5. An entrance guide for guiding cables and the like into a conduit comprising:
   a hollow, generally funnel-shaped body having an open, relatively large diameter entrance end through which the cables are adapted to enter the body and an opposite open, relatively small diameter exit end for connection to the conduit;
   an entrance guide plate disposed within said entrance end of said body and having a number of generally radial cable-receiving openings spaced about the axis of said body;
   means connecting said guide plate to said body for limited floating movement of said plate relative to said body about said axis;
   said body having an opening in the wall thereof through which grease may be packed into said body; and
   a flexible resilient sheet secured to the inner surface of said guide plate and having normally closed slits aligned with said cable-receiving openings, respectively, for preventing leakage of grease through said latter openings.

6. A guide according to claim 5 wherein:
   said connecting means comprise screws threaded in the wall of said body and engaging in circumferentially elongated grooves in the edge of said plate to permit removal of said plate from said body.

7. A guide according to claim 5 wherein:
   said body is flexible to permit the ends of said body to be disposed in various relative angular positions; and
   a supporting member secured to said body and adapted for attachment to a fixed support for supporting said entrance end of said body in a given attitude relative to the exit end of said body.

References Cited

UNITED STATES PATENTS 3,005,620 10/1961 Trunnell _____ 254—134.3
3,218,033 11/1965 Miller _____ 254—134.3

OTHELL M. SIMPSON, *Primary Examiner.*